US010594585B2

(12) United States Patent
Ganster

(10) Patent No.: US 10,594,585 B2
(45) Date of Patent: Mar. 17, 2020

(54) METHODS AND SYSTEMS FOR POLLING DEVICES

(71) Applicant: Comcast Cable Communications, LLC, Philadelphia, PA (US)

(72) Inventor: Christopher Ganster, Villanova, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 187 days.

(21) Appl. No.: 15/463,611

(22) Filed: Mar. 20, 2017

(65) Prior Publication Data

US 2018/0270137 A1    Sep. 20, 2018

(51) Int. Cl.
| | | |
|---|---|---|
| *G06F 15/16* | (2006.01) | |
| *H04L 12/26* | (2006.01) | |
| *H04L 12/28* | (2006.01) | |
| *H04L 29/08* | (2006.01) | |
| *H04L 12/24* | (2006.01) | |

(52) U.S. Cl.
CPC ........ *H04L 43/103* (2013.01); *H04L 12/2803* (2013.01); *H04L 12/2818* (2013.01); *H04L 12/2834* (2013.01); *H04L 67/125* (2013.01); *H04L 41/08* (2013.01)

(58) Field of Classification Search
CPC ... H04L 43/103; H04L 12/2818; H04L 41/08; H04L 67/125; H04L 12/2803; H04L 12/2834
USPC .................................................. 709/208, 203
See application file for complete search history.

(56) References Cited

U.S. PATENT DOCUMENTS

| | | | |
|---|---|---|---|
| 8,504,680 B1 | 8/2013 | Hernacki et al. | |
| 8,724,612 B2 | 5/2014 | Al-Khudairi | |
| 2012/0131095 A1* | 5/2012 | Luna | H04L 67/04 709/203 |
| 2016/0041534 A1 | 2/2016 | Gupta | |

FOREIGN PATENT DOCUMENTS

WO    WO 2016/126097 A1    8/2016

OTHER PUBLICATIONS

Siddiqui, et al.: "Towards dynamic polling: Survey and analysis of Channel Polling mechanisms for Wireless Sensor Networks", 2016 International Conference on Intelligent Systems Engineering (ICISE), IEEE, (2016), pp. 356-363 (Abstract).
European Search Report and Written Opinion dated Jul. 3, 2018 by the European Patent Office for EP Application No. 18162900.7, filed on Mar. 20, 2018 and published as EP 3379775 on Sep. 26, 2018 (Applicant—Comcast Cable Communications, LLC) (23 Pages).

* cited by examiner

*Primary Examiner* — Frantz B Jean
(74) *Attorney, Agent, or Firm* — Ballard Spahr LLP

(57) ABSTRACT

Systems and methods are described for adjusting polling frequency of a premises device that can comprise determining a user interaction with an interface associated with the premises device, and transmitting an instruction to increase a polling frequency of the premises device from a first frequency to a second frequency. The premises device can receive, via a network, one or more commands and a second instruction to decrease the polling frequency from the second frequency to the first frequency. The device can revert the polling frequency to the first frequency in response to the second instruction.

20 Claims, 8 Drawing Sheets

METHODS AND SYSTEMS FOR POLLING DEVICES

BACKGROUND

In order to save energy, thermostats, lights, and other premises devices are not constantly connected to a network so as to conserve battery power. Instead, these devices poll a management device (e.g., a touchpad, an application server, or the like) at a predefined polling interval to determine if any new commands related to the premises device have been received at the management device. Accordingly, when a user device sends a command to the management device (e.g., by a user entering a command at the management device, transmitting a command to the management device, etc.), the polling interval can create a delay between entry of the command and reflection of the command at the premises device.

SUMMARY

It is to be understood that both the following general description and the following detailed description are exemplary and explanatory only and are not restrictive. Methods and systems are described for improving efficiency of polling data from premises devices, such as Internet of Things (IoT) devices, home automation devices, controllable devices, home security devices, premises management devices, thermostats, lights, any electronic devices, and/or the like. The premises devices may exchange data/commands with users/user applications through a local management device and/or a remote server. The premises device may poll the local management device and/or the remote server for the data/commands in order to cause a change at the premises device (e.g., adjust temperature). Typically, the premises device has a defined polling frequency, set to enhance power efficiency of the device (e.g., poll over a lengthy polling interval). In the present systems and methods, once a user accesses and/or interacts with an application for interfacing with the premises device, the application can provide a message to the local management device and/or the remote server, that, when retrieved by the premises device at the next poll, may cause the premises device to change (e.g., increase) the polling frequency of the premises device. For example, the polling frequency can be increased so that the premises device will poll the local management device and/or the remote server for information at the increased frequency. Responsive to the user finishing accessing and/or interacting with the application (e.g., by the user logging out of the application, leaving the particular screen associated with the premises device, allowing the administration session to expire through inaction, etc.), the application can transmit a message to the local management device and/or the remote server, that, retrieval by the premises device at the next poll, will cause the interactive device to again change the polling frequency of the premises device. For example, the polling frequency can be decreased so that the premises device will poll the local management device and/or the remote server for information at a decreased frequency.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
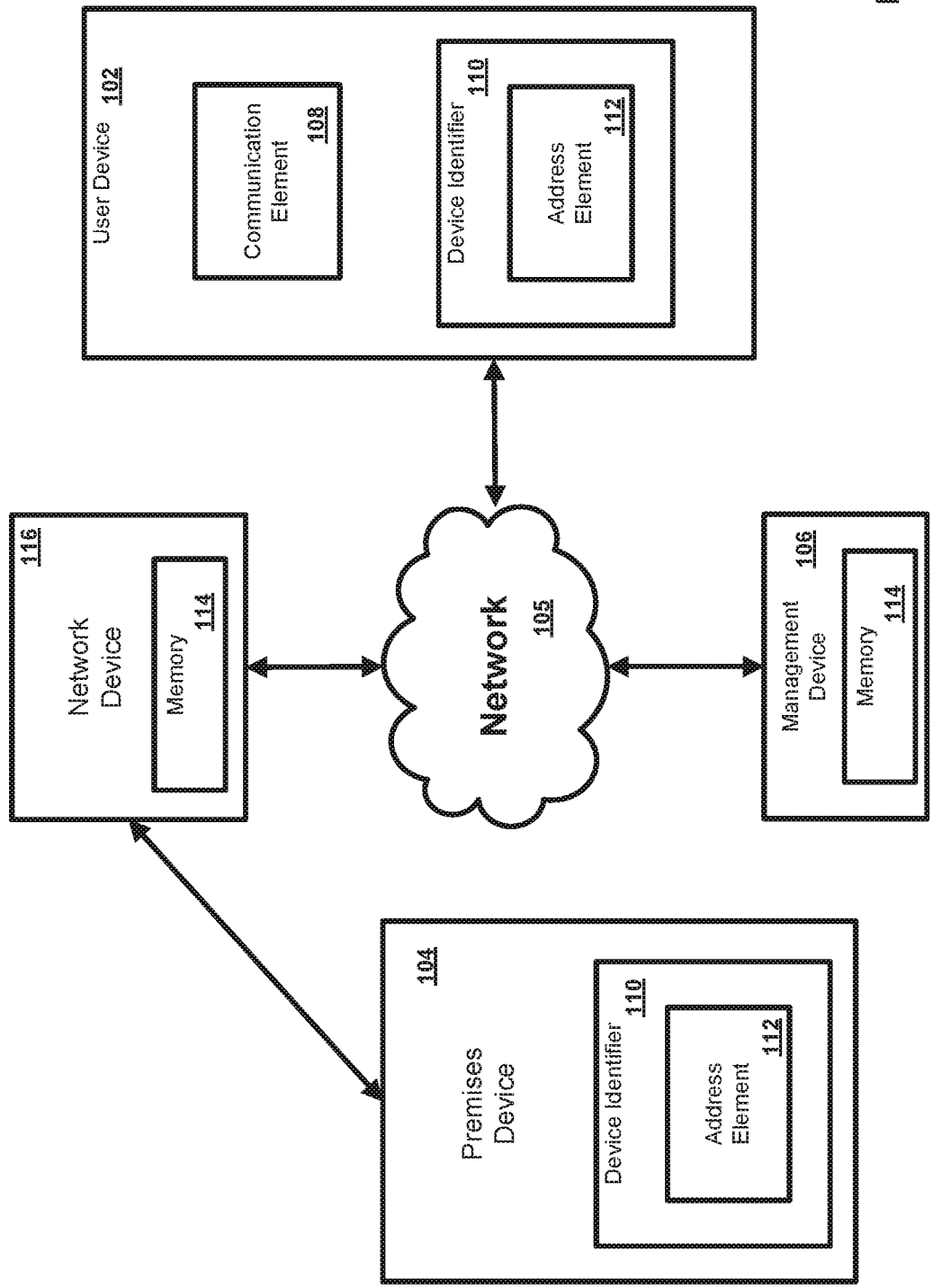
FIG. 1 is a block diagram illustrating various aspects of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2. MPEG, MPEG4 UHD, HDR. 4k, AdobeR. Flash, Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data, Secondary Audio Programs (SAP), Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content. "providing" content, "viewing" content, "listening" to content. "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

Methods and systems are described for increasing responsiveness of polling devices. Premises devices (e.g., Internet of Things (IoT) devices, home automation devices, controllable devices, home security devices, premises management devices, thermostats, lights, any electronic devices, and the like) can retrieve commands from a management device. The management device can comprise, for example, a network-enabled kevpad or server in communication with the premises device. A user can interact with a user device to provide a command for the premises device. For example, the user device can transmit a command to the management device. The user device can transmit a command to the management device using an application and via a network.

Responsive to the user interacting with the application to send a command to the premises device (e.g., by opening an application for communicating with the premises device, navigating to a part of an application associated with the premises device, etc.) the application can transmit an indication of interaction with the premises device. For example, the indication of interaction can comprise an indication that the user is entering an interactive mode, an administrative mode, or other mode that allows the user to enter commands to be executed by the premises device. The indication can be received by the management device, and the management device can transmit a signal to the premises device to cause the premises device to decrease the amount of time between polling, thereby increasing the polling frequency of the premises device. Alternatively, the management device can queue up a command for delivery to the premises device during the next polling session by the premises device to cause the premises device to decrease the amount of time between polling, thereby increasing the polling frequency of the premises device. Thus, the premises device can more frequently connect to the management device via the network to determine if the user has entered a command for the premises device. In this way, the premises device can more immediately react to commands entered by the user.

Upon another interaction with the application (e.g., a logout event), the premises device can be caused to revert back to a decreased polling frequency by increasing the amount of time between polling the management device. The interaction with the application can cause the user device to send a command to the management device. In response to receiving the command from the user device, the management device can queue up a command for delivery to the premises device during the next polling session by the premises device to cause the premises device to increase the amount of time between polling, thereby decreasing the polling frequency of the premises device. The interaction with the application can cause the user device to send a command to the management device. The management device can transmit, to the premises device, a command to cause the premises device to increase the amount of time between polling, thereby decreasing the polling frequency of the premises device. The decreased polling frequency can be, for example, the original polling frequency or another polling frequency that is decreased relative to the increased polling frequency. The interaction with the application can comprise the user device transmitting a logout command to the management device, the user device exiting the application used to communicate with the management device, a predefined time period elapsing without receipt of a command from the user device, and/or the like.

FIG. 1 shows an exemplary system. For example, the system can facilitate communications between a user device 102 (such as a computer, tablet, mobile device, communications terminal, or the like), a premises device 104 (such as a smart thermostat, a smart light bulb, or other premises device), and/or a management device 106 (such as a remote computing device (e.g., a server)).

The user device 102 can be in communication with the management device 106, such as a server, for example. The management device 106 can be disposed locally or remotely relative to the user device 102. As an example, the user device 102 and the management device 106 can be in communication via a private and/or public network 105 such as the Internet or a local area network. The network 105 can comprise, for example, a wireless network as described by IEEE 802.11, a personal area network, such as a low energy personal area network (e.g., a ZigBee® network, a Bluetooth low energy network, an ANT network, a Radio Frequency for Consumer Electronics (RF4CE) network, and/or the like), a Low-Power Wide-Area Network (LP-WAN) such as a LoRa network, and/or combinations thereof, etc. Other forms of communications can be used such as wired and wireless telecommunication channels, for example.

The user device 102 can be an electronic device such as a computer, a smartphone, a laptop, a tablet, a set top box, a display device, or other device capable of communicating with the management device 106. As an example, the user device 102 can comprise a communication element 108 for providing an interface to a user to interact with the user device 102 and/or the management device 106. The communication element 108 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the management device 106. As an example, the communication element 108 can transmit data to a local or remote device such as the management device 106.

Each of the user device 102 and the premises device 104 can be associated with a user identifier or device identifier 110. As an example, the device identifier 110 can be any identifier, token, character, string, or the like, for differentiating one user or device (e.g., user device 102, premises device 104) from another user or device. The device identifier 110 can identify a user or device as belonging to a particular class of users or devices. As a further example, the device identifier 110 can comprise information relating to the device such as a manufacturer, a model or type of device, a service provider associated with the device, a property of the device, a locator, and/or a label or classifier. Other information can be represented by the device identifier 110.

The device identifier 110 can comprise an address element 112. The address element 112 can comprise or provide an internet protocol address, a network address, a media access control (MAC) address, an Internet address, or the like. As an example, the address element 112 can be relied upon to establish a communication session between the device (e.g., the user device 102 or the premises device 104) and the management device 106 or other devices and/or networks. As a further example, the address element 112 can be used as an identifier or locator of the device. The address element 112 can be persistent for a particular network.

The management device 106 can be a server for communicating with the user device 102 and the premises device 104. As an example, the management device 106 can communicate with the user device 102 for providing data and/or services. As an example, the management device 106 can provide a method for the user device 102 to provide commands to the premises device 104. For example, the management device 106 can be configured or disposed at a premises at which the premises device 104 is disposed. In other examples, the management device 106 can be disposed at a location other than the premises at which the premises device 104 is disposed. The management device 106 can comprise a memory location 114 for storing data from the user device 102 and/or the premises device 104. The stored data can comprise, for example, one or more commands intended for the premises device 104.

The management device 106 can manage the communication between the user device 102 and the premises device 104 for sending and receiving data therebetween. As an example, the user device 102 can transmit one or more instructions intended for the premises device 104 to the management device 106 (e.g., via the network 105). The management device 106 can store the one or more commands at the memory 114. The premises device 104 can poll the management device 106 (e.g., the memory 114) to determine if one or more instructions for the premises device 104 have been received. The memory 114 can be local to the management device 106. Alternatively, the memory 114 can be at another device in communication with the management device 106 and the premises device 104 (e.g., a gateway device, such as network device 116). The user device 102 can transmit data and/or instructions to the memory 114 of the network device 116. Similarly, the management device 106 can transmit data and/or instructions to the memory 114 of the network device 116.

The premises device 104 can comprise, for example, an Internet of Things (IoT) device, a home automation device, a controllable device, a home security device, a premises management device, a thermostat, a light, any electronic device configured to receive wireless signals to change a property of the premises device, and/or the like. The premises device 104 is not always connected to a network, sending and receiving message via the network, or otherwise interacting with the management device 106 (or other devices) via the network. Rather, the premises device 104 can periodically connect to the network 105, such as a Wi-Fi network (e.g., a network compliant with standards set forth in IEEE 802.11), low energy personal area network (e.g., a ZigBee® network, a Bluetooth low energy network, an ANT network, a Radio Frequency for Consumer Electronics (RF4CE) network, and/or the like), a Low-Power Wide-Area Network (LPWAN) such as a LoRa network, and/or combinations thereof. The premises device 104 can communicate with the network device 116 to determine if one or more commands are stored in the memory 114. The premises device 104 can retrieve any commands stored in the memory 114 and disconnect from the network. Alternatively, the premises device 104 can connect to the management device 106 via the network device 116 and the network 105 to communicate with the memory 114 disposed locally at the management device 106. In other words, the premises device can poll the memory 114. The period at which the premises device 104 polls the memory 114 can be termed a polling period. The polling frequency of the premises device 104 may be the inverse of the polling period.

The premises device 104 can poll the management device 106 at a defined frequency. The management device 106 can comprise, for example, a gateway, a server, a local computing device, a remote computing device, and/or the like. Polling the management device 106 can comprise polling a memory (e.g., the memory 114) in communication with the management device 106. The polling can comprise retrieving one or more instructions from the management device 106. The user device 102 can transmit one or more instructions to the management device 106 for retrieval by the premises device 104. A user can activate an application stored on the user device 102 to control the premises device 104. The application stored on the user device 102 can be used to connect to the management device 106 via the application stored on the user device 102. For example, the application can be an application specific to the premises device 104 that the user seeks to control, a web browser directed to a URL specific to the premises device 104, a home security and/or home automation application, combinations thereof, and/or the like. As an example, activation of the application stored on the user device 102 can cause the user device 102 to send data (e.g., an instruction) to the management device 106 associated with the premises device 104. As another example (e.g., in the scenario of a single application controlling multiple devices), a user navigating to a portion of the application associated with control of a particular premises device 104 can cause the user device 102 to send the data to a management device 106 associated with the particular premises device 104. The management device 106 can be determined based on the device identifier 110 associated with the premises device 104. For example, if a user opens a home security and/or home automation application and navigates to an interface associated with a thermostat, the navigation can cause the user device to send the data to a management device 106 associated with the thermostat; if the user navigates to an interface associated with smart lighting, the navigation can cause the user device 102 to send the data to the management device 106 associated with the smart lighting.

The premises device 104 can retrieve the instruction from the management device 106 according to a polling frequency $F_1$. The premises device 104 can increase polling frequency (decrease polling interval) to a frequency $F_2$ in response to retrieving the instruction. For example, the frequency $F_1$ can be once per minute (e.g., the polling interval is one minute). This can allow the premises device 104 to be relatively power-efficient. In response to receiving the instruction at the premises device 104, the premises device 104 can increase the polling frequency to the frequency $F_2$ of every 10 seconds (e.g., the polling interval is 10 seconds). Thus, the polling interval is decreased and the polling frequency is increased in response to the instruction.

The user device 102 can transmit an instruction to the management device 106. The instruction can be generated based on, for example, a session of the application associated with the premises device 104 ending, a logout event from the user device 102 (such as the user device 102 logging out of the application associated with the premises device 104), the user device exiting the application for controlling the premises device 104, the user navigating away from an interface in the application associated with the premises device, or the like. The instruction can be generated, as another example, based on a lapse of a time period without receipt of an instruction from the user device 102, and/or the like. As specific, non-limiting examples, the time period can be one minute, five minutes, or the like. The management device 106 can store the instruction to the memory 114 for retrieval by the premises device 104.

The premises device 104 can retrieve the instruction from the management device 106 at the increased polling rate $F_2$. The premises device 104 can increase the polling period (decrease the polling frequency) in response to retrieving the instruction. For example, the premises device 104 can decrease the polling frequency to a frequency $F_3$. The frequency $F_3$ can be equal to the frequency $F_1$. Alternatively, the frequency $F_3$ can be different from the frequency $F_1$, as long as $F_3$ is less than $F_2$.

The network 105 can comprise a low energy personal area network. Alternatively, the network 105 and the low energy personal area network can be separate. The network 105 can be created by the controller 106. The network 105 can be created by one or more external network devices 116 (e.g., one or more gateway devices). As an example, one or more of the network devices 116 can facilitate the connection of a device, such as user device 102, the premises device 104, and/or the management device 106 to the network 105. As a further example, one or more of the network devices 116 can be configured as a wireless access point (WAP). One or more network devices 116 can be configured to allow one or more wireless devices to connect to a wired and/or wireless network using Wi-Fi, Bluetooth or any desired method or standard. The network device 116 can comprise controller functionality. For example, the network device 116 can comprise a home security/automation control panel. The network device 116 can communicate via one or more of a Wi-Fi signal, a personal area network signal such as a ZigBee® signal, a Bluetooth low energy signal, an ANT signal, a Radio Frequency for Consumer Electronics (RF4CE) signal, and/or the like, a Low-Power Wide-Area Network (LPWAN) signal such as a LoRa signal, and/or combinations thereof. The memory 114 can be disposed at the network device 116.

Figure 2:
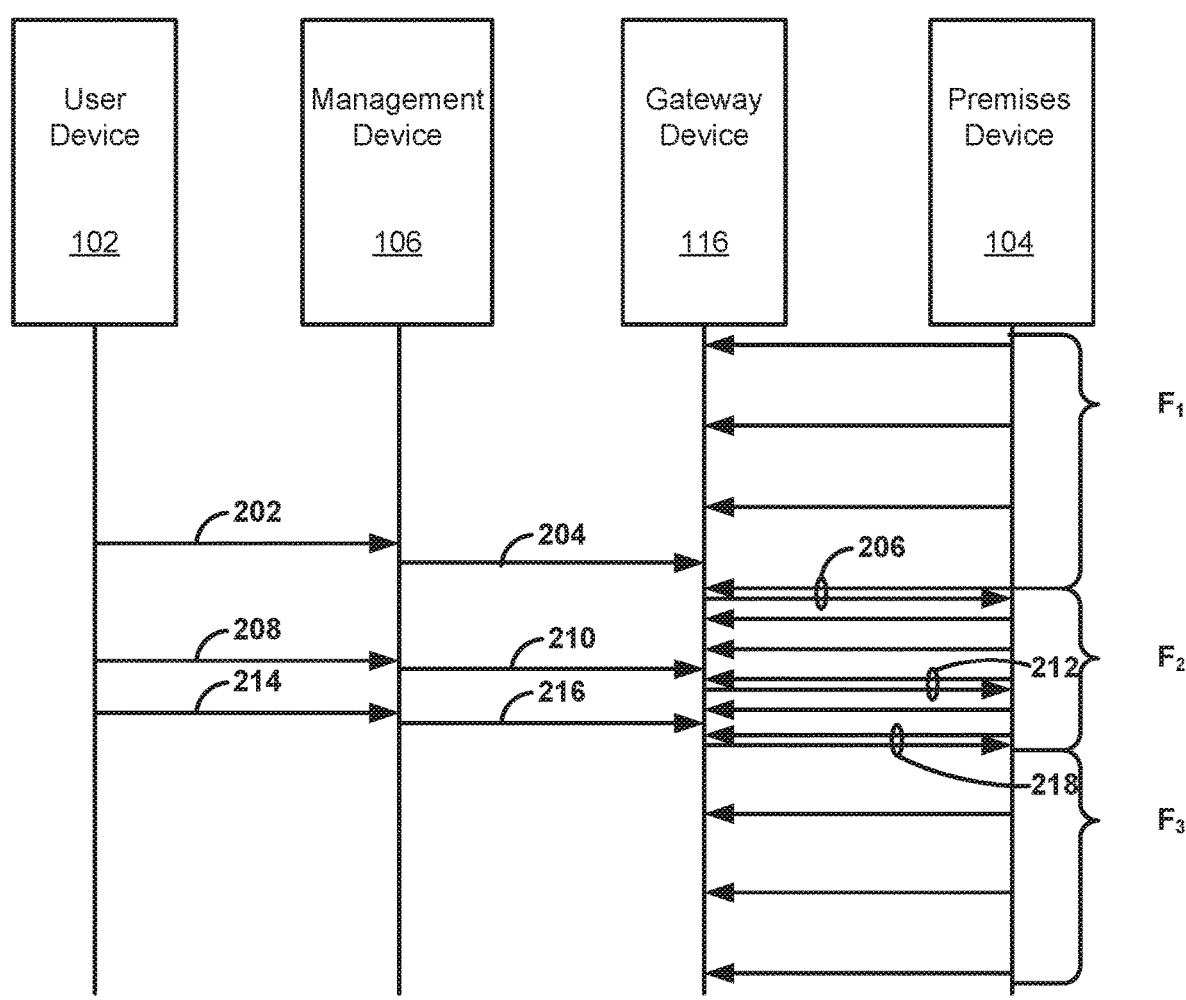
FIG. 2 shows a data flow of an example system.

FIG. 2 shows a data flow for an example system. In step 202, a user can activate an application stored on a user device (e.g., the user device 102) to control a premises device (e.g., the premises device 104). The application stored on the user device can be used to connect to a server (e.g., the management device 106) via the application stored on the user device. For example, the application can be an application specific to the premises device the user seeks to control, a web browser directed to a URL specific to the premises device, a home security and/or home automation application, combinations thereof, and/or the like. Activation of the application stored on the premises device can cause the user device to send data (e.g., an instruction) to a server associated with the premises device. Alternatively (e.g., when a single application can control multiple devices), a user navigating to a portion of the application associated with control of a particular premises device can cause the user device to send the data to a server associated with the particular premises device. For example, if a user opens a home security and/or home automation application and navigates to an interface associated with a thermostat, the navigation can cause the user device to send the data to a server associated with the thermostat, if the user navigates to an interface associated with smart lighting, the navigation can cause the user device to send the data to a server associated with the smart lighting.

In step 204 the server can transmit an instruction based on the received data associated with activation of the application on the user device. As an example, the server can transmit the instruction to a device, such as a gateway device (e.g., the network device 116). A memory of the gateway device can be accessible by both the server and the premises device. The instruction can be configured to cause the premises device to increase a polling frequency (e.g., reduce a time between polling events) of the premises device. The server can forward the data received from the user device. Alternatively, the server formats the data received from the user device to match a command format of the premises device before transmitting the data to the premises device.

The gateway device can vary depending on the way the premises device is connected to the network. For example, a ZigBee®-enabled premises device can receive commands from the server via a ZigBee® gateway, a Wi-Fi-enabled premises device can receive commands from the server via a wireless gateway, a LoRa-enabled premises device can receive commands from the server via a LoRa gateway, etc.

In step 206, the premises device can retrieve the instruction from the gateway device according to a polling frequency $F_1$. The premises device can increase polling frequency (e.g., decrease polling interval) to a frequency $F_2$ in response to retrieving the instruction. For example, the frequency $F_1$ can be once per minute (e.g., the polling interval is one minute). This can allow the premises device to be relatively power-efficient. In response to receiving the instruction at the premises device, the premises device can increase the polling frequency to the frequency $F_2$ of every 10 seconds (e.g., the polling interval is 10 seconds). Thus, the polling interval is decreased and the polling frequency is increased in response to the instruction.

In step 208, the user device, based on user interaction with the application, can transmit an instruction requesting action by the premises device. For example, when the premises device is a thermostat, the user can interact with the application to adjust the temperature in a room, causing the user device to transmit a temperature change instruction. The instruction requesting action can be transmitted to the server. The first instruction can comprise an identifier (e.g., the identifier 110) associated with the premises device.

In step 210, the server can transmit the instruction requesting action to the gateway device. For example, the server can transmit the instruction requesting action to a memory of the gateway device.

In step 212, the premises device can retrieve, from the gateway device, the instruction requesting action. For example, the premises device can access the gateway device at the increased polling frequency $F_2$ to determine if one or more instructions associated with the premises device are stored at a memory (e.g., memory 114) of the gateway device. The premises device can act on the received instruction. For example, a smart thermostat retrieving an instruction to adjust a temperature (or other property) can set a temperature based on the retrieved instruction. The premises device can continue polling at the increased polling frequency $F_2$.

In step 214, the user device can transmit another instruction to the server. The another instruction can be generated based on, for example, a session of an application for controlling the remote device ending, a logout event from the user device (e.g., the user device logging out of the server associated with the premises device), the user device exiting an application for controlling the remote device, or the like. The another instruction can be generated based on a lapse of a time period without receipt of any instruction at the user device, and/or the like. The time period can be on the order of one minute, on the order of five minutes, or the like.

In step 216, the server can transmit the another instruction to the gateway device. The instruction can be stored in a memory in communication with the gateway device for retrieval by the premises device.

In step 218, the premises device can retrieve the instruction from the gateway device (e.g., the memory in communication with the gateway device) at the increased polling rate $F_2$. The instruction can be retrieved from the gateway device in response to the premises device polling for instructions from the server at the gateway device. The premises device can increase the polling period (decrease the polling frequency) in response to the end of session instruction. For example, the premises device can decrease the polling frequency to a frequency $F_3$. The frequency $F_3$ can be equal to the frequency $F_1$. Alternatively, the frequency $F_3$ can be different from the frequency $F_1$, as long as $F_3$ is less than $F_2$.

Figure 3:
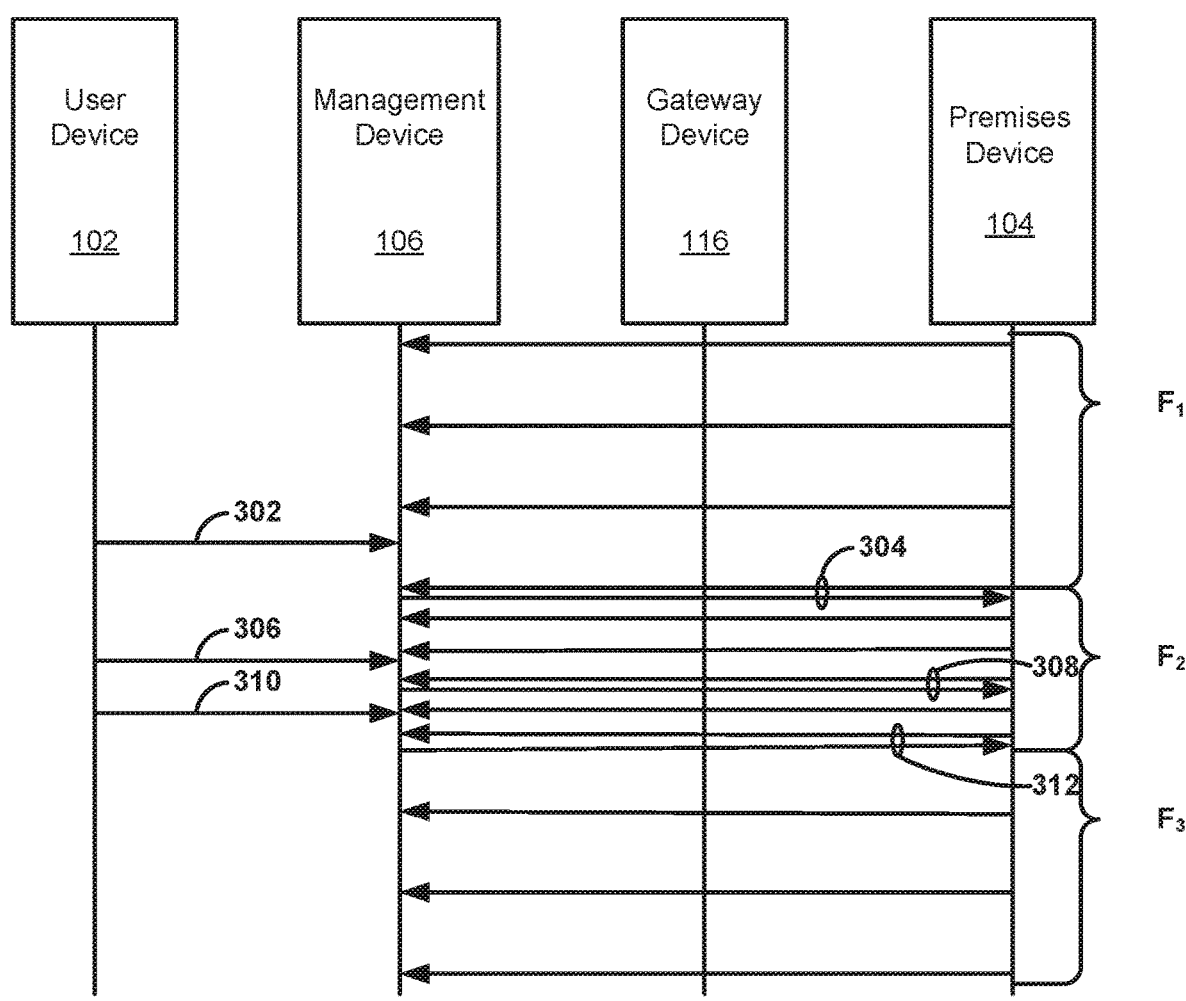
FIG. 3 shows a data flow of an example system.

FIG. 3 shows a data flow for another example system. In step 302, a user can activate an application stored on a user device (e.g., the user device 102) to control a premises device (e.g., the premises device 104). The application stored on the user device can be used to connect to a management device (e.g., the management device 106) via the application stored on the user device. For example, the application can be an application specific to the premises device the user seeks to control, a web browser directed to a URL specific to the premises device, a home security and/or home automation application, combinations thereof, and/or the like. Activation of the application stored on the premises device can cause the user device to send data (e.g., an instruction) to a management device associated with the premises device. Alternatively (e.g., when a single application can control multiple devices), a user navigating to a portion of the application associated with control of a particular premises device can cause the user device to send the data to a management device associated with the particular premises device. For example, if a user opens a home security and/or home automation application and navigates to an interface associated with a thermostat, the navigation can cause the user device to send the data to a management device associated with the thermostat; if the user navigates to an interface associated with smart lighting, the navigation can cause the user device to send the data to a management device associated with the smart lighting.

The management device can store an instruction (e.g., a first instruction) based on the received data associated with activation of the application on the user device. As an example, the management device can store the instruction to a memory (e.g., the memory 114) in communication with (e.g., local to or otherwise accessible by) the server. The instruction can be configured to cause the premises device to increase a polling frequency (e.g., reduce the time between polling events) of the premises device. The management device can store the data received from the user device. Alternatively, the management device formats the data received from the user device to match a command format of the premises device before storing the data to the memory.

In step 304, the premises device can retrieve the instruction from the management device (e.g., a memory in communication with the management device) at the management device according to a polling frequency $F_1$. The premises device can connect to the management device via a gateway device (e.g., the network device 116). The premises device can increase polling frequency (e.g., decrease the polling interval) to a frequency $F_2$ in response to retrieving the instruction. For example, the frequency $F_1$ can be once per minute (e.g., the polling interval is one minute). This can allow the premises device to be relatively power-efficient. In response to retrieving the instruction, the premises device can increase the polling frequency to the frequency $F_2$ of every 10 seconds (e.g., the polling interval is 10 seconds). Thus, the polling interval is decreased and the polling frequency is increased in response to the instruction.

In step 306, the user device, based on user interaction with the application, can transmit an instruction (e.g., a second instruction) requesting action by the premises device. For example, when the premises device is a thermostat, the user can interact with the application to adjust the temperature in a room, causing the user device to transmit a temperature change instruction. The instruction requesting action can be transmitted to the management device. The management device can store the instruction requesting action to the memory.

In step 308, the premises device can retrieve the instruction requesting action by the premises device from the management device at the increased polling frequency $F_2$. The premises device can act on the retrieved instruction. For example, a thermostat retrieving an instruction to adjust a temperature can set a temperature based on the retrieved instruction. The premises device can continue polling at the increased polling frequency $F_2$.

In step 310, the user device can transmit another instruction (e.g., a third instruction) to the management device. The another instruction can be generated based on, for example, a session of an application for controlling the remote device ending, a logout event from the user device, such as the user device logging out of the server associated with the premises device, the user device exiting an application for controlling the remote device, or the like. Alternatively, the another instruction can be generated based on a lapse of a time period without receipt of an instruction at the user device, and/or the like. The time period can be on the order of one minute, on the order of five minutes, or the like. The management device can store the another instruction to the memory for retrieval by the premises device.

In step 312, the premises device can retrieve the another instruction from the management device at the increased polling rate $F_2$. The another instruction can be retrieved via a gateway device in communication with the management device. The premises device can increase the polling period (decrease the polling frequency) in response to the another instruction. For example, the premises device can decrease the polling frequency to a frequency $F_3$. The frequency $F_3$ can be equal to the frequency $F_1$. Alternatively, the frequency $F_3$ can be different from the frequency $F_1$, as long as $F_3$ is less than $F_2$.

Figure 4:
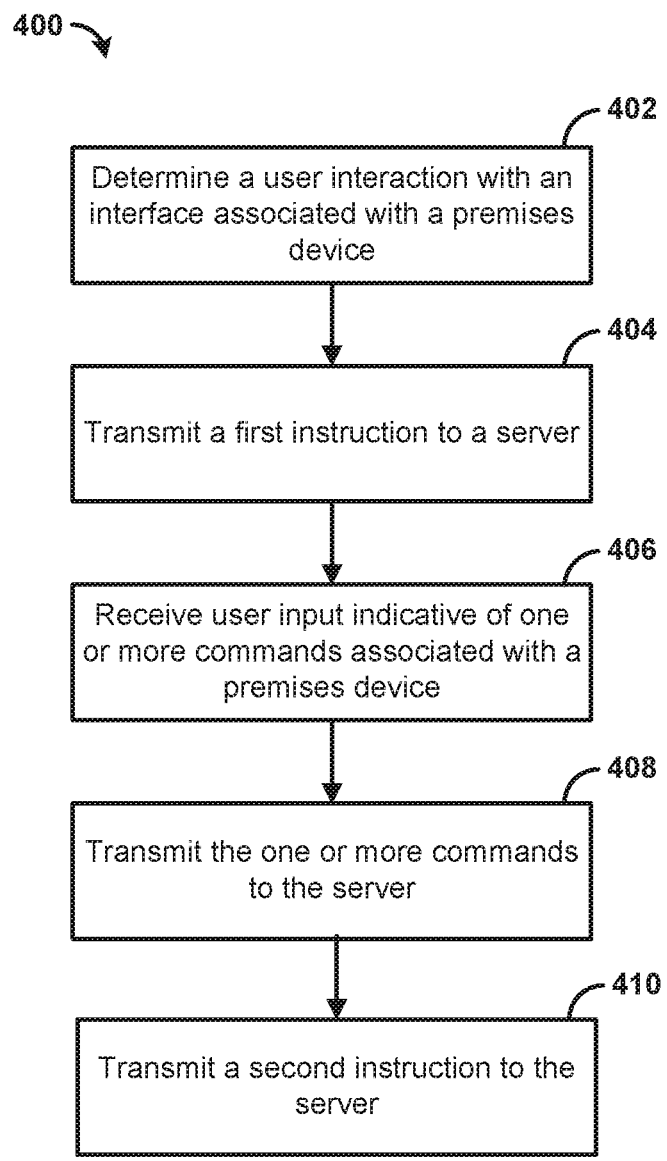
FIG. 4 is a flowchart illustrating an example method.

FIG. 4 shows an example method 400. In step 402, a user device (e.g., the user device 102) can determine (e.g., receive) a user interaction associated with a premises device (e.g., the premises device 104). For example, the premises device can be a device that a user desires to control. Determining the user interaction can comprise the user opening an application stored on the user device that is associated with the premises device. For example, the application can comprise an application configured to send commands to the premises device. Alternatively (e.g., when a single application can control multiple premises devices), determining the user interaction can comprise a user navigating to a portion of the application (e.g., a particular page or menu) associated with control of a particular premises device. The user interaction can comprise, for example, an identifier (e.g., the identifier 110) associated with the premises device, an identifier of a server (e.g., the management device 106) associated with the premises device, and/or the like.

In step 404, the user device can transmit a first instruction to the server. The instruction can be for (e.g., associated with) the premises device. The first instruction can be transmitted to the server associated with the premises device. The premises device can be configured to retrieve commands from a memory (e.g., the memory 114) in communication with the server. The memory can be local to the server. Alternatively, the memory can be at another device accessible by both the server and the premises device. For example, the memory can be located at a gateway device (e.g., the network device 116). The data indicative of the first instruction for the premises device can comprise the first instruction. Alternatively, the data indicative of the first instruction can be formatted as the first instruction for the premises device by the server.

The premises device can be configured to poll the server (e.g., the memory in communication with the server) at a first polling frequency. The first polling frequency can be selected to enhance power efficiency of the premises device. Accordingly, the first polling frequency can be relatively low. For example, the first polling frequency can be on the order of once per minute.

The first instruction can comprise an instruction to increase the polling frequency of the premises device. In particular, the first instruction can comprise an instruction to increase the polling frequency (e.g., reduce the time between polling events) of the premises device from a first polling frequency to a second polling frequency. For example, the second polling frequency can be an increased frequency relative to the first polling frequency. As a particular example, if the first polling frequency is once per minute, the increased polling frequency can be once per 10 seconds (e.g., six times per minute). In response to retrieving the first instruction, the premises device can adjust the polling frequency of the premises device based on the first instruction.

In step 406, the user device can receive input indicative of one or more commands associated with the premises device.

For example, the one or more commands associated with the premises device can comprise one or more commands to change a property of the premises device. For example, the user device can receive input from a user indicative of the one or more commands associated with the premises device. As particular examples, a property can comprise a temperature setting, an arm/disarm setting, and/or on/off setting.

In step 408, the user device can transmit the one or more commands. The one or more commands associated with the premises device can be transmitted to the server (e.g., the management device 106) associated with the premises device. The premises device can be configured to retrieve the one or more commands associated with the premises device at the increased polling frequency. The premises device can further be configured to act on the retrieved one or more commands associated with the premises device. For example, the premises device can be a smart thermostat, and the one or more commands associated with the thermostat can comprise a command to increase a temperature set by the thermostat. The thermostat can be configured to adjust the temperature in response to the command to increase the temperature.

In step 410, the user device can be configured to transmit a second instruction to the server. For example, the second instruction can comprise an end of session indication. The second instruction can comprise an instruction to decrease the polling frequency of the premises device. In particular, the second instruction can adjust the polling frequency to a reduced polling frequency relative to the second polling frequency. The reduced polling frequency can be the same as the first polling frequency. Alternatively, the reduced frequency can be any frequency that is less than the second polling frequency.

Transmitting the second instruction can be performed in response to the user device determining a lapse in user interaction. As specific examples, determining the lapse in user interaction can comprise determining that a user has exited an application for controlling the premises device, determining that a user has navigated away from a portion of an application associated with the premises device, and/or determining lapse of a time period without user interaction with the user device. For example, if the user does not interact with the user device for a predefined time period (e.g., one minute, five minutes, etc.).

Figure 5:
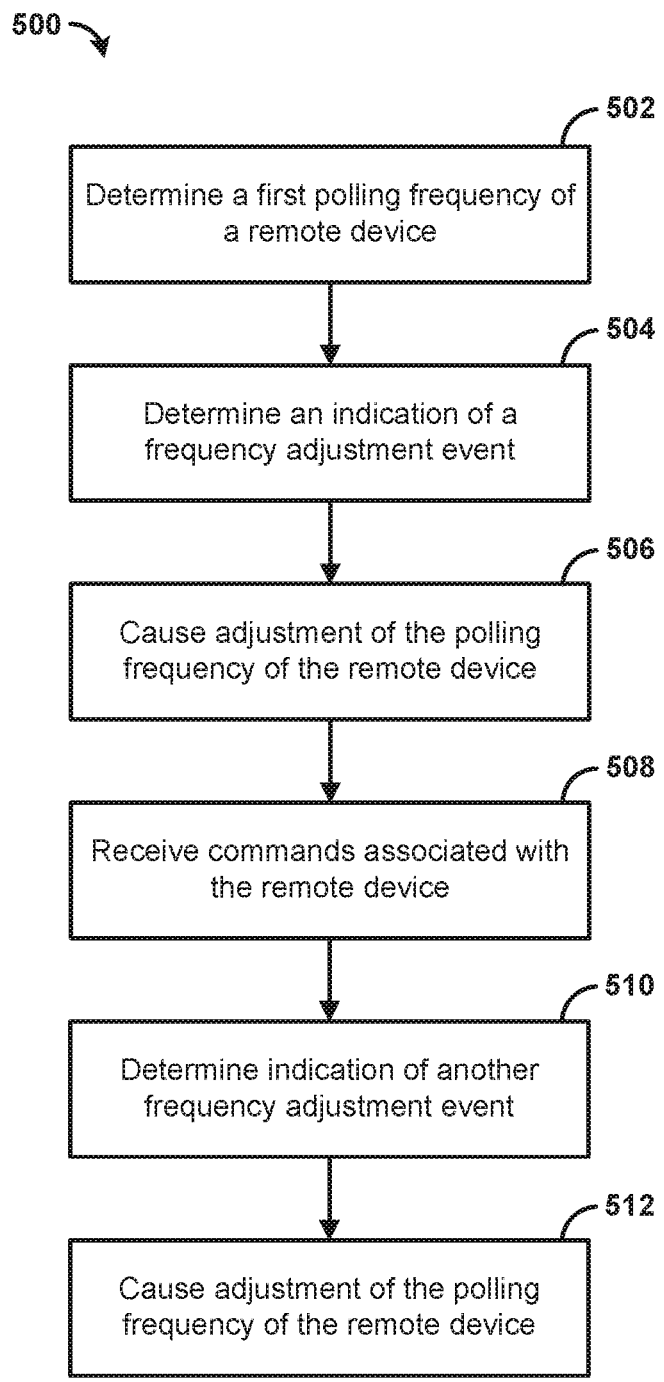
FIG. 5 is a flowchart illustrating an example method.

FIG. 5 shows an example method 500. In step 502, a polling frequency of a remote device can be established. The remote device can be a premises device (e.g., the premises device 104), such as a thermostat, a network-enabled light bulb, and/or other network-connected devices. The polling can comprise the remote device connecting to a gateway device. Alternatively, the polling can comprise the remote device connecting to a network (e.g., a local area network, a personal area network, or the like). As an example, the network can be a low energy wireless network, such as a ZigBee® network, a Bluetooth low energy network, an ANT network, a Radio Frequency for Consumer Electronics (RF4CE) network, another low energy personal area network, or a Low-Power Wide-Area Network (LPWAN) such as a LoRa network. The server and the remote device are connected via a personal area network, necessitating that the server and the remote device be in the same premises. The polling can further comprise the remote device checking a management device (e.g., a memory (e.g., the memory 114) in communication with the management device) by connecting to a management device (e.g., a server) or a gateway device (e.g., the network device 116) to determine if one or more commands issued for the remote device are stored at the server. The remote device can be connected to the server via a gateway device. The gateway device can vary depending on the type of network connection used by the remote device. For example, a ZigBee®-enabled remote device can receive commands from the server via a ZigBee® gateway, a Wi-Fi-enabled remote device can receive commands from the server via wireless gateway, a LoRa-enabled remote device can receive commands from the server via Lora gateway, etc.

As an example, the polling frequency can be determined to be a first frequency. The first frequency can be selected as a frequency that helps to minimize battery usage, thereby prolonging battery life for the remote device. The first frequency can be predefined, and the determination can comprise determining that the remote device should operate using the predefined frequency. As an example, the first frequency can be once per minute, once per 30 seconds, once per 15 seconds, and/or the like.

In step 504, the remote device can determine an indication of a frequency adjustment event. For example, a user device can log in to an application that communicates with the server for controlling the remote device, navigate to a portion of an application associated with the remote device, navigate to a URL associated with the remote device, or the like. The server can provide an indication of the login for retrieval by the remote device. For example, the server can store the indication at the memory. The remote device can retrieve the indication from the memory at the next polling time (e.g., when the polling interval elapses). The frequency adjustment event can comprise, for example, a user device providing login credentials (e.g., a username and/or password) to an application in communication with the server, the user device activating an application that communicates with the server to provide a command for the remote device, the user device navigating to a particular portion of an application that communicates with the server configured for providing a command to the remote device, and the like.

In step 506, the remote device can cause adjustment of the polling frequency of the remote device to be a second frequency. The second frequency can be increased relative to the first frequency. That is, the polling interval can be decreased, thereby increasing the polling frequency. The polling frequency can be set at a value that makes the remote device receiving command feel substantially instantaneous from the perspective of a user operating the user device. As a particular example, the second frequency can be once per second, once every two seconds, or the like.

In step 508, the remote device can receive one or more commands associated with the remote device. For example, the remote device can poll the server at the increased second frequency to monitor for one or more commands issued by the user device. In response to determining that one or more commands have been issued, the remote device can retrieve the one or more commands. The remote device can also act on the retrieved one or more commands. For example, the remote device can adjust one or more properties of the remote device based on the one or more commands. As particular examples, adjusting one or more properties of the remote device can comprise altering one or more of a temperature setting, an arm/disarm setting, and/or on/off setting.

In step 510, the remote device can determine an indication of another frequency adjustment event. The another frequency adjustment event can be, for example, a lapse in user interaction. The determination can comprise receiving an indication of a lapse in user interaction from the server. The indication of the lapse in user interaction may comprise a user device logging out of the management device, a user device exiting an application for controlling the premises device, and/or lapse of a time period without receipt of an instruction at the premises device.

In step 512, the remote device can cause the polling frequency of the remote device to be adjusted. For example, the remote device can cause the polling frequency to revert to the first frequency. The polling frequency can revert in response to occurrence of another frequency adjustment event, such as a logout event. The another frequency adjustment event can comprise, for example, the user device logging out of the server associated with the remote device, the user device exiting an application for controlling the remote device, a lapse of a time period without receipt of an instruction at the remote device, and/or the like. The time period can be on the order of one minute, on the order of five minutes, or the like.

Figure 6:
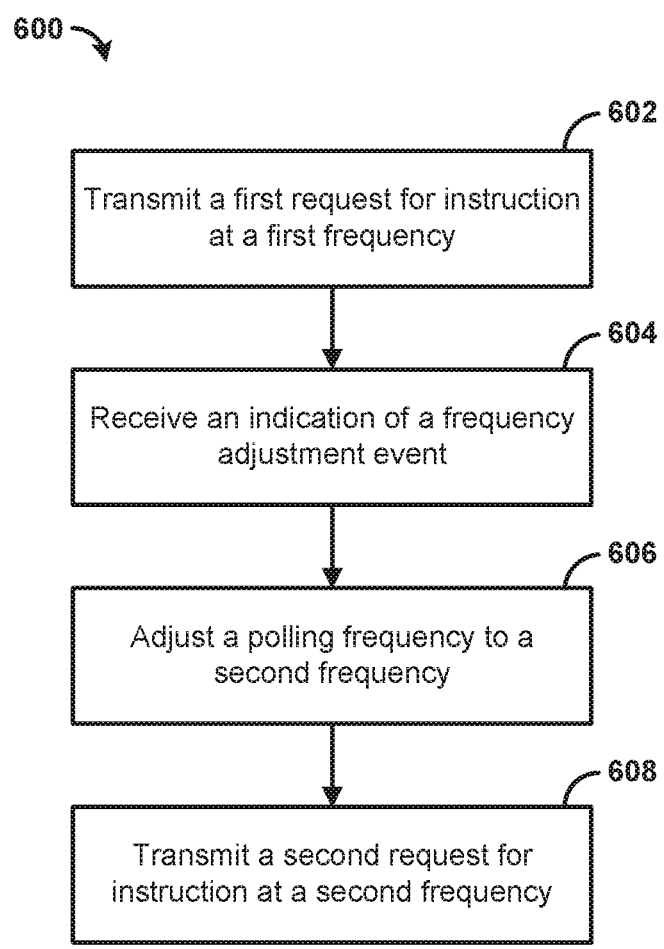
FIG. 6 is a flowchart illustrating an example method.

FIG. 6 shows an example method 600. In step 602, a remote device (e.g., the premises device 104) can transmit a request for instruction (e.g., poll) to a gateway device (e.g., a memory of a gateway device (e.g., the network device 116)) at a first frequency. The polling can comprise the remote device connecting to the gateway device. Alternatively, the polling can comprise the remote device connecting to a network (e.g., a local area network, a personal area network, or the like). As an example, the network can be a Wi-Fi network, a low energy wireless network, such as a ZigBee® network, a Bluetooth low energy network, an ANT network, a Radio Frequency for Consumer Electronics (RF4CE) network, a Low-Power Wide-Area Network (LP-WAN) such as a LoRa network, or other low energy personal area network. The server and the remote device can be connected via a personal area network, necessitating that the server and the remote device be in the same premises, and the memory can be disposed at the server. The memory can be disposed at the gateway device, and the remote device can connect to the gateway device. The polling can further comprise the remote device connecting to the gateway device to determine if one or more commands issued for the remote device are stored at the gateway device.

As an example, the first frequency can be selected as a frequency that helps to minimize battery usage, thereby prolonging battery life for the remote device. The first frequency can be predefined, and determining the first frequency can comprise determining that the remote device should operate using the predefined frequency. As an example, the first frequency can be once per minute, once per 30 seconds, once per 20 seconds, once per 15 seconds, once per 10 seconds, and/or the like.

In step 604, the remote device can receive an indication of a frequency adjustment event. The indication of the frequency adjustment event can comprise an instruction related to user administration of the device from the memory. For example, a user device can log in to an application that communicates with the server for controlling the remote device. The indication can be received from the server. The server can provide an indication of the login for retrieval by the remote device as the indication of the frequency adjustment event. For example, the server can store the indication at the gateway device (e.g., the memory in communication with the gateway device). The remote device can retrieve the indication from the gateway device via the network at the next polling time (e.g., when the polling interval elapses). The indication of the frequency adjustment event can further comprise an instruction to increase polling frequency.

In step 606, the remote device can adjust a polling frequency of the remote device to a second frequency. The polling frequency can be adjusted in response to the indication of the frequency adjustment event. The second frequency can be increased relative to the first frequency. That is, the polling interval can be decreased, thereby increasing the polling frequency. The polling frequency can be set at a value that makes the remote device receiving command feel substantially instantaneous from the perspective of a user operating the user device. As a particular example, the second frequency can be on the order of once per second, once every two seconds, or the like.

In step 608, the remote device can transmit a second request for instruction (e.g., poll) to the gateway device (e.g., the memory in communication with the gateway device) at the second frequency. The second request for instruction can be transmitted to determine if an instruction for the device has been received at the gateway device. The remote device can monitor the gateway device for one or more commands issued by the user device. In response to determining that a command has been issued, the remote device can retrieve the command. The remote device can also act on the retrieved command.

The remote device can determine whether a time period has lapsed. The time period can be measured from the retrieved instruction related to user administration at step 604. Alternatively, the time period can be measured from the last retrieved instruction. The time period can be predefined, or can be based on one or more factors, such as number of commands received during user administration, user information, historical length of administration periods, and/or the like.

In response to lapse of the time period, the remote device can adjust a polling frequency of the remote device. Adjusting the polling frequency can comprise adjusting the polling frequency from the second frequency to the first frequency. Adjusting the polling frequency can comprise adjusting the polling frequency to be any frequency that is decreased relative to the second frequency. The remote device can transmit a request for instruction (e.g., poll) the gateway device at the adjusted frequency to determine if an instruction for the device has been entered at the gateway device.

The remote device can determine a lapse in user interaction. The determination can comprise, for example, determining that the user device has exited an application for controlling the premises device, determining that a user has navigated away from a portion of an application associated with the premises device, and the like.

In response to the lapse in user interaction, the remote device can adjust a polling frequency of the remote device. Adjusting the polling frequency can comprise adjusting the polling frequency from the second frequency to the first frequency. Adjusting the polling frequency can comprise adjusting the polling frequency to be any frequency that is decreased relative to the second frequency. The remote device can transmit a request for instruction (e.g., poll) the server at the adjusted frequency to determine if an instruction for the device has been entered at the server.

Figure 7:
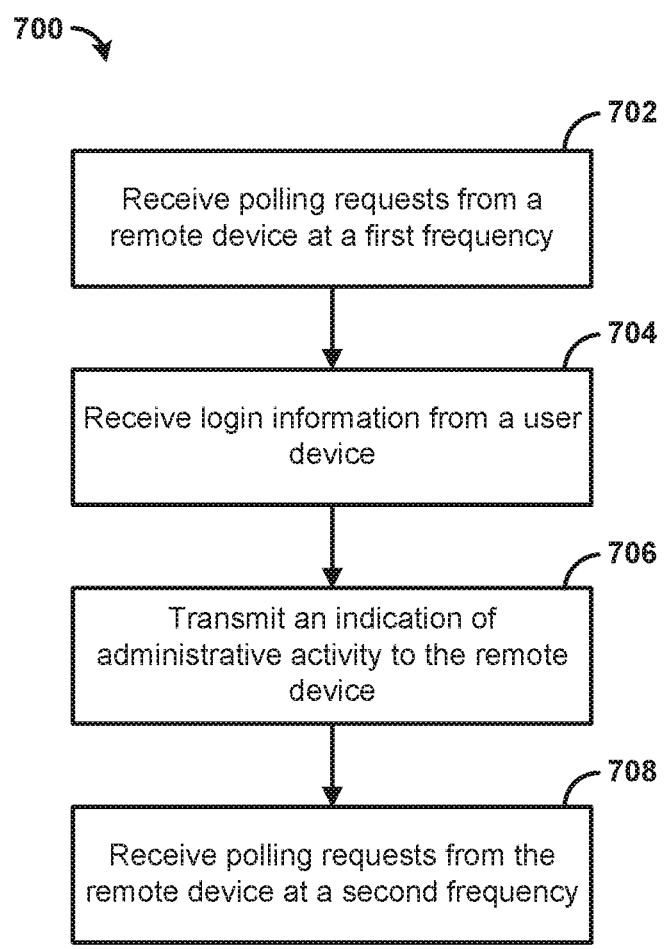
FIG. 7 is a flowchart illustrating an example method.

FIG. 7 shows an example method 700. In step 702, a server (e.g., the management device 106) can receive polling requests for an instruction at a first frequency. The polling requests can comprise a request from the remote device via a network (e.g., a wide area network, a local area network, a personal area network, or the like). As an example, the network can be the Internet, a Wi-Fi network, a low energy wireless network, such as a ZigBeel network, a Bluetooth low energy network, an ANT network, a Radio Frequency for Consumer Electronics (RF4CE) network, or other low energy personal area network, or a Low-Power Wide-Area Network (LPWAN) such as a LoRa network. The network can be created by the server. Alternatively, the server and the remote device can connect to a network created by a network device (e.g., a gateway device). The server and the remote device are connected via a personal area network, necessitating that the server and the remote device be in the same premises. Alternatively, the server and the remote device can be connected via a local area network, a wide area network, the Internet, and/or the like. The server can comprise a device configured to control the remote device, such as a keypad, a server computer, or other device. The polling requests can be from a remote device. The first frequency can be selected as a frequency that helps to minimize battery usage by the remote device, thereby prolonging battery life for the remote device. The first frequency can be predefined. As an example, the first frequency can be once per minute, once per 30 seconds, once per 20 seconds, once per 15 seconds, once per 10 seconds, and/or the like.

In step 704, the server can receive login information related to a user device. The user device can be associated with the remote device. The login information can be received from a user device, such as a smartphone, a tablet computer, a personal computer, or the like. The login information can be received via the low energy personal area network. Alternatively, server can receive the information via a local area network, a wide area network, or the like. The login information can comprise, for example, a usemame and password, a MAC address associated with the user device, and/or the like.

In step 706, the server can transmit, to the remote device, an indication of administrative activity related to the remote device. The indication of administrative activity can be provided to the remote device in response to receiving the login information at the server. For example, the server can store the indication of administrative activity at a memory address known to the remote device. The remote device can retrieve the indication from the memory location and via the network at the next polling time (e.g., when the polling interval elapses).

The indication of administrative activity can comprise the received login information. The indication of administrative activity can further comprise an instruction to increase polling frequency at the remote device. The indication of administrative activity related to the remote device can comprise an indication that the user device has entered one or more commands for the remote device.

In step 708, the server can receive, from the remote device and via the personal area network, polling requests for an instruction at a second frequency. The second frequency can be increased relative to the first frequency.

The server can receive, from the user device, a logout command. In response to the logout command, the server can provide, for retrieval by the remote device, an indication of termination of the administrative activity related to the remote device.

The server can determine that the user device is no longer active. The determination can be based on, for example, a predefined period of time elapsing without receiving an instruction relating to the administrative activity from the user device. In response to determining that the user device is no longer active, the server can provide, for retrieval by the remote device, an indication of termination of the administrative activity related to the remote device.

Figure 8:
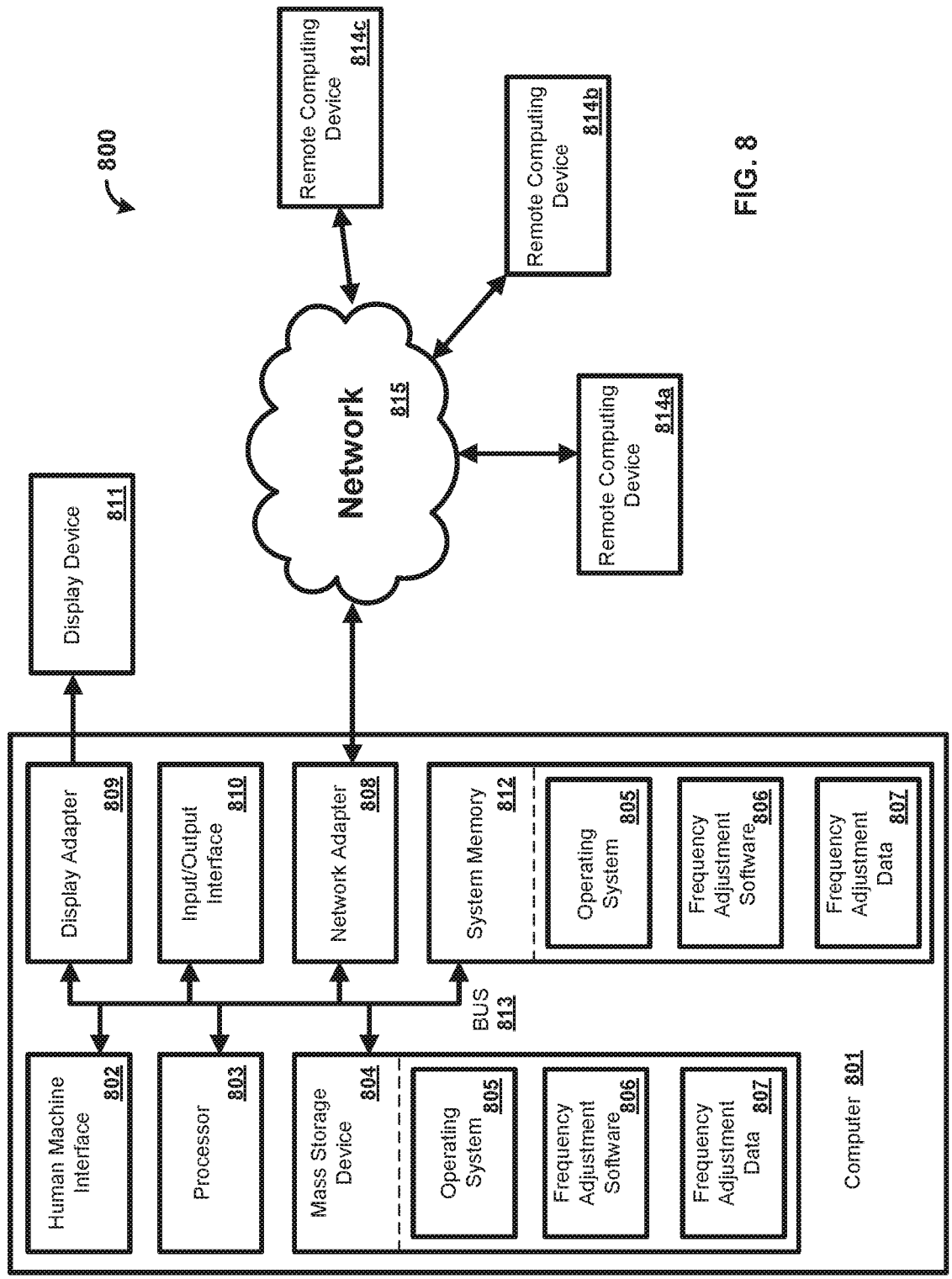
FIG. 8 is a block diagram illustrating an example computing device.

In an exemplary aspect, the methods and systems can be implemented on a computer 801 as illustrated in FIG. 8 and described below. By way of example, one or more of the remote device, the user device, and the management device of FIG. 1 can be a computer as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors 803, a system memory 812, and a system bus 813 that couples various system components including the one or more processors 803 to the system memory 812. The system can utilize parallel computing.

The system bus 813 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 813, and all buses specified in this description can also be implemented over a wired or wireless network connection and each of the subsystems, including the one or more processors 803, a mass storage device 804, an operating system 805, polling frequency adjustment software 806, polling frequency adjustment data 807, a network adapter 808, the system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as the polling frequency adjustment data 807 and/or program modules such as the operating system 805 and the polling frequency adjustment software 806 that are immediately accessible to and/or are presently operated on by the one or more processors 803.

The computer 801 can also comprise other removable/non-removable, volatile/non-volatile computer storage media. By way of example, FIG. 8 illustrates the mass storage device 804 which can provide non-volatile storage of computer code, computer readable instructions, data structures, program modules, and other data for the computer 801. For example and not meant to be limiting, the mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, the operating system 805 and the polling frequency adjustment software 806. Each of the operating system 805 and the polling frequency adjustment software 806 (or some combination thereof) can comprise elements of the programming and the polling frequency adjustment software 806. The polling frequency adjustment data 807 can also be stored on the mass storage device 804. The polling frequency adjustment data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 803 via the human machine interface 802 that is coupled to the system bus 813, but can be connected by other interface and bus structures, such as a parallel port, game port, an IEEE 1394 Port (also known as a Firewire port), a serial port, or a universal serial bus (USB).

The display device 811 can also be connected to the system bus 813 via an interface, such as the display adapter 809. It is contemplated that the computer 801 can have more than one display adapter 809 and the computer 801 can have more than one display device 811. For example, the display device 811 can be a monitor, an LCD (Liquid Crystal Display), or a projector. In addition to the display device 811, other output peripheral devices can comprise components such as speakers (not shown) and a printer (not shown) which can be connected to the computer 801 via the Input/Output Interface 810. Any step and/or result of the methods can be output in any form to an output device. Such output can be any form of visual representation, including, but not limited to, textual, graphical, animation, audio, tactile, and the like. The display device 811 and computer 801 can be part of one device, or separate devices.

The computer 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computer 801 and a remote computing device 814a,b,c can be made via a network 815, such as a local area network (LAN) and/or a general wide area network (WAN). Such network connections can be through the network adapter 808. The network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the one or more processors 803 of the computer. An implementation of the polling frequency adjustment software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    determining, by a user device, an access of an application associated with a premises device;
    based on the access, sending, by the user device to a management device, a first instruction for the premises device to increase a polling frequency of the premises device from a first polling frequency to a second polling frequency;
    receiving, by the user device, an indication of selection of one or more commands associated with the premises device;
    sending, by the user device to the management device, the one or more commands; and
    sending, by the user device to the management device, a second instruction for the premises device to decrease the polling frequency of the premises device from the second polling frequency to the first polling frequency.

2. The method of claim 1, wherein the application associated with the premises device is configured to control the premises device.

3. The method of claim 1, further comprising determining a user interaction with an interface of the application associated with the premises device.

4. The method of claim 1, wherein sending, by the user device to the management device, the second instruction is based on a determination of a lapse in a user interaction.

5. The method of claim 4, wherein the determination of the lapse in the user interaction comprises at least one of determining that the user device has exited the application associated with the premises device, determining that a user has navigated away from a portion of the application associated with the premises device, or determining lapse of a time period without user interaction with the user device.

6. The method of claim 1, wherein the premises device comprises an electronic device configured to:
    receive wireless signals, and
    adjust one or more properties of the premises device.

7. A method comprising:
    receiving, by a premises device from a management device based on a user device accessing an application associated with the premises device, an indication of a frequency adjustment event;
    adjusting, by the premises device based on the indication of the frequency adjustment event, a polling frequency of the premises device from a first polling frequency to a second polling frequency;
    receiving, by the premises device, one or more commands associated with the premises device;
    determining, by the premises device, an indication of another frequency adjustment event; and
    adjusting, by the premises device based on the indication of the another frequency adjustment event, the polling frequency of the premises device from the second polling frequency to the first polling frequency.

8. The method of claim 7, wherein the frequency adjustment event comprises the user device logging in to the management device.

9. The method of claim 7, wherein the application associated with the premises device comprises an application for controlling the premises device.

10. The method of claim 7, wherein the another frequency adjustment event comprises an indication of a lapse in a user interaction.

11. The method of claim 10, wherein the indication of the lapse in the user interaction comprises the user device exiting the application associated with the premises device or the user device logging out of the management device.

12. The method of claim 10, wherein the indication of the lapse in the user interaction comprises lapse of a time period without receipt of an instruction by the premises device.

13. The method of claim 7, wherein the management device and the premises device are located at a same premises.

14. The method of claim 7, further comprising changing, by the premises device, one or more properties of the premises device.

15. The method of claim 14, wherein the one or more properties of the premises device comprises one or more of a temperature setting, an arm/disarm setting, or an on/off setting.

16. A method comprising:
    transmitting, by a premises device to a management device based on a first polling frequency, a first request for instruction;
    receiving, by the premises device from the management device based on a user device accessing an application associated with the premises device, an indication of a frequency adjustment event;
    adjusting, based on the indication of the frequency adjustment event, a polling frequency of the premises device from the first polling frequency to a second polling frequency; and
    sending, by the premises device to the management device based on the second polling frequency, a second request for instruction.

17. The method of claim 16, further comprising:
determining that a predefined time period has lapsed;
adjusting, by the premises device based on determining that the predefined time period has lapsed, the polling frequency of the premises device from the second polling frequency to the first polling frequency; and
sending, by the premises device to the management device based on the first polling frequency, a third request for instruction.

18. The method of claim 16, further comprising:
determining, by the premises device, an indication of a lapse in a user interaction;
adjusting, by the premises device based on the indication of the lapse in the user interaction, the polling frequency of the premises device from the second polling frequency to the first polling frequency; and
sending, by the premises device to the management device based on the first polling frequency, a fourth request for instruction.

19. The method of claim 18, wherein the determining the indication of the lapse in the user interaction comprises at least one of determining that the user device has exited the application associated with the premises device or determining that a user has navigated away from a portion of the application associated with the premises device.

20. The method of claim 16, wherein the premises device comprises a device configured to:
receive wireless signals, and
adjust one or more properties of the premises device.

* * * * *